United States Patent
Shimizu

(10) Patent No.: US 11,577,724 B2
(45) Date of Patent: Feb. 14, 2023

(54) DRIVING ASSISTANCE APPARATUS

(71) Applicant: DENSO CORPORATION, Kariya (JP)

(72) Inventor: Takahiro Shimizu, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/114,879

(22) Filed: Aug. 28, 2018

(65) Prior Publication Data
US 2019/0071080 A1    Mar. 7, 2019

(30) Foreign Application Priority Data

Sep. 6, 2017 (JP) .............................. JP2017-171223

(51) Int. Cl.
*B60W 30/12* (2020.01)
*G05D 1/02* (2020.01)
*G06T 7/12* (2017.01)
*G06K 9/00* (2006.01)
*B60W 30/165* (2020.01)
(Continued)

(52) U.S. Cl.
CPC .......... *B60W 30/12* (2013.01); *G05D 1/0246* (2013.01); *G06T 7/12* (2017.01); *G06V 20/588* (2022.01); *B60W 10/20* (2013.01); *B60W 30/165* (2013.01); *G06T 2207/30256* (2013.01)

(58) Field of Classification Search
CPC .................................................... B60W 30/12
See application file for complete search history.

(56) References Cited

U.S. PATENT DOCUMENTS 8,248,263 B2 *  8/2012  Shervey ................ B66F 17/003
                                                340/686.1
8,520,695 B1 *  8/2013  Rubin .............. G08G 1/096791
                                                    370/445
(Continued)

FOREIGN PATENT DOCUMENTS

CN     101944176 A  *  1/2011  ............ B60W 30/09
JP     2005-165421 A      6/2005
(Continued)

OTHER PUBLICATIONS

Google Machine English Translation of Japanese Patent Pub. No. JP4582170B2 (downloaded on Mar. 24, 20).*
(Continued)

*Primary Examiner* — Jean Paul Cass
(74) *Attorney, Agent, or Firm* — Maschoff Brennan

(57) ABSTRACT

In a driving assistance apparatus, an image acquiring unit acquires a captured image captured by an onboard camera. Based on the captured image acquired by the image acquiring unit, a boundary line recognizing unit recognizes a boundary line that demarcates a traffic lane in which an own vehicle is driving. A road information acquiring unit acquires road information related to a road on which the own vehicle is driving. Based on the road information acquired by the road information acquiring unit, a degree-of-reliability setting unit sets a degree of reliability of the boundary line recognized by the boundary line recognizing unit. Based on the boundary line recognized by the boundary line recognizing unit, a driving assisting unit performs driving assistance of the own vehicle and varies control content of the driving assistance based on the degree of reliability.

12 Claims, 11 Drawing Sheets

(51) Int. Cl.
*B60W 10/20* (2006.01)
*G06V 20/56* (2022.01)

(56) References Cited

U.S. PATENT DOCUMENTS

| | | | |
|---|---|---|---|
| 8,892,356 B1* | 11/2014 | Weiland | G01C 21/3658 |
| | | | 701/454 |
| 9,626,879 B2* | 4/2017 | Manci | G09B 5/00 |
| 9,661,472 B2* | 5/2017 | Gherardi | G05D 1/00 |
| 9,836,966 B2* | 12/2017 | Peterson | G08G 1/056 |
| 9,895,974 B2* | 2/2018 | Watanabe | G06T 11/001 |
| 9,928,429 B2* | 3/2018 | Baba | G06T 7/254 |
| 9,988,048 B1* | 6/2018 | Song | G01B 11/026 |
| 10,160,485 B2* | 12/2018 | You | B62D 6/002 |
| 10,198,685 B2* | 2/2019 | Simon | G06K 19/07762 |
| 10,217,354 B1* | 2/2019 | Burke | G07C 5/008 |
| 10,296,795 B2* | 5/2019 | Kwant | G08G 1/09623 |
| 10,309,796 B2* | 6/2019 | Weiland | G01C 21/26 |
| 10,323,386 B2* | 6/2019 | Kiyota | F15B 15/1447 |
| 10,336,353 B2* | 7/2019 | Carlson | B61L 23/06 |
| 10,380,473 B2* | 8/2019 | Manci | G05D 1/021 |
| 10,386,792 B2* | 8/2019 | Blayvas | G01S 13/723 |
| 10,414,432 B2* | 9/2019 | Saito | G06K 9/00 |
| 10,515,521 B2* | 12/2019 | Klein | G08B 25/08 |
| 10,544,899 B2* | 1/2020 | Hakins | F16P 3/145 |
| 10,546,561 B2* | 1/2020 | Kusanagi | G02B 27/01 |
| 10,589,752 B2* | 3/2020 | Mimura | B60K 35/00 |
| 10,650,252 B2* | 5/2020 | Kaneko | G06T 7/13 |
| 2005/0004753 A1* | 1/2005 | Weiland | G01C 21/26 |
| | | | 701/532 |
| 2005/0125154 A1 | 6/2005 | Kawasaki | |
| 2006/0233425 A1 | 10/2006 | Kobayashi et al. | |
| 2008/0007429 A1 | 1/2008 | Kawasaki et al. | |
| 2008/0159549 A1* | 7/2008 | Copley | G10K 11/17854 |
| | | | 381/58 |
| 2009/0299630 A1* | 12/2009 | Denaro | G06F 16/29 |
| | | | 707/999.001 |
| 2010/0042282 A1 | 2/2010 | Taguchi et al. | |
| 2014/0129073 A1* | 5/2014 | Ferguson | B60W 30/18163 |
| | | | 701/23 |
| 2015/0151786 A1 | 6/2015 | Fujii | |
| 2017/0057540 A1 | 3/2017 | Anma et al. | |
| 2017/0069339 A1* | 3/2017 | Braskich | G10L 25/51 |
| 2017/0139417 A1* | 5/2017 | Reiff | G06V 20/588 |
| 2017/0243485 A1* | 8/2017 | Rubin | H04W 4/12 |
| 2018/0106885 A1* | 4/2018 | Blayvas | G01S 13/931 |
| 2018/0373941 A1* | 12/2018 | Kwant | G08G 1/0145 |

FOREIGN PATENT DOCUMENTS

| | | | | |
|---|---|---|---|---|
| JP | 2005-346304 A | 12/2005 | | |
| JP | 2006-301722 A | 11/2006 | | |
| JP | 2008-033872 A | 2/2008 | | |
| JP | 2008-129804 A | 6/2008 | | |
| JP | 2009-146289 A | 7/2009 | | |
| JP | 2010-069921 A | 4/2010 | | |
| JP | 4582170 B2 * | 11/2010 | | B60W 40/076 |
| JP | 2015-105047 A | 6/2015 | | |
| JP | 2015-217737 A | 12/2015 | | |
| JP | 2016-105256 A | 6/2016 | | |
| JP | 2017-043246 A | 3/2017 | | |
| JP | 2017-043279 A | 3/2017 | | |
| JP | 2017-052411 A | 3/2017 | | |
| JP | 2017-084137 A | 5/2017 | | |

OTHER PUBLICATIONS

Google Machine translation of JP2005346304A that published in Dec. 15, 2005.*
Google Machine translation of JP2016105256A that published in 2016.*
Google Machine translation of JP2017043279A that published in 2017.*
Google Machine translation of JP2017084137A that published in 2017.*

* cited by examiner

FIG.7

|  | UNERASED LINE INFORMATION | LANE-INCREASE INFORMATION, MERGE INFORMATION, AND INTERSECTION INFORMATION | ROAD GRADIENT INFORMATION |
|---|---|---|---|
| RELIABILITY LEVEL 1 | ACQUIRED | ACQUIRED/ NOT ACQUIRED | ACQUIRED/ NOT ACQUIRED |
| RELIABILITY LEVEL 2 | NOT ACQUIRED | ACQUIRED | ACQUIRED |
| RELIABILITY LEVEL 3 | NOT ACQUIRED | ACQUIRED | NOT ACQUIRED |
| RELIABILITY LEVEL 4 | NOT ACQUIRED | NOT ACQUIRED | ACQUIRED |
| RELIABILITY LEVEL 5 | NOT ACQUIRED | NOT ACQUIRED | NOT ACQUIRED |

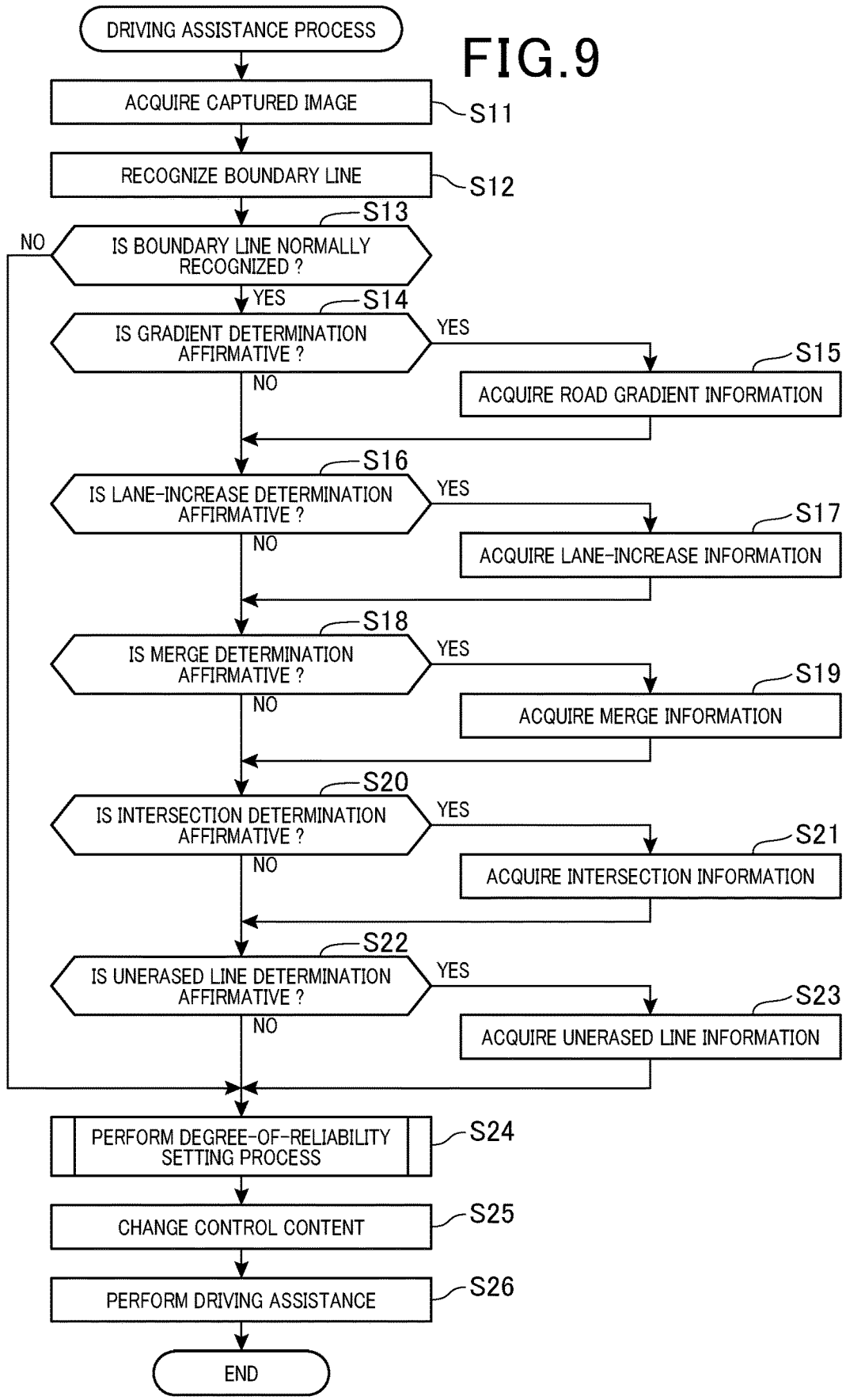

DRIVING ASSISTANCE APPARATUS

CROSS-REFERENCE TO RELATED APPLICATION

This application is based on and claims the benefit of priority from Japanese Patent Application No. 2017-171223, filed Sep. 6, 2017. The entire disclosure of the above application is incorporated herein by reference.

BACKGROUND

Technical Field

The present disclosure relates to a driving assistance apparatus for a vehicle.

Related Art

A driving assistance apparatus that recognizes a white line (boundary line) from a captured image of an area ahead of a vehicle is known. The white line demarcates a traffic lane. The driving assistance apparatus provides driving assistance such that the vehicle drives along the white line (refer to, for example, JP-A-2015-217737).

Here, a degree of reliability of white-line recognition differs depending on road conditions. For example, in cases in which a road gradient of a predetermined magnitude or greater is present, the degree of reliability of white-line recognition decreases. When the degree of reliability of white-line recognition decreases, appropriate driving assistance may not be performed.

SUMMARY

It is thus desired to provide a driving assistance apparatus that performs appropriate driving assistance.

An exemplary embodiment provides a driving assistance apparatus that includes: an image acquiring unit that acquires a captured image captured by an onboard camera; a boundary line recognizing unit that recognizes a boundary line that demarcates a traffic lane in which an own vehicle is driving, based on the captured image acquired by the image acquiring unit; a road information acquiring unit that acquires road information related to a road on which the own vehicle is driving; a degree-of-reliability setting unit that sets a degree of reliability of the boundary line recognized by the boundary line recognizing unit, based on the road information acquired by the road information acquiring unit; and a driving assisting unit that performs driving assistance of the own vehicle based on the boundary line recognized by the boundary line recognizing unit, and varies control content of the driving assistance based on the degree of reliability.

The degree of reliability of the boundary line recognized by the boundary line recognizing unit is set based on the road information. The control content of the driving assistance is varied based on the degree of reliability. Consequently, appropriate driving assistance can be performed based on the road information.

BRIEF DESCRIPTION OF THE DRAWINGS

In the accompanying drawings:
FIG. 7 is a diagram of a relationship between road information and degree of reliability;
FIG. 9 is a flowchart of a driving assistance process.

DESCRIPTION OF THE EMBODIMENTS

Figure 1:
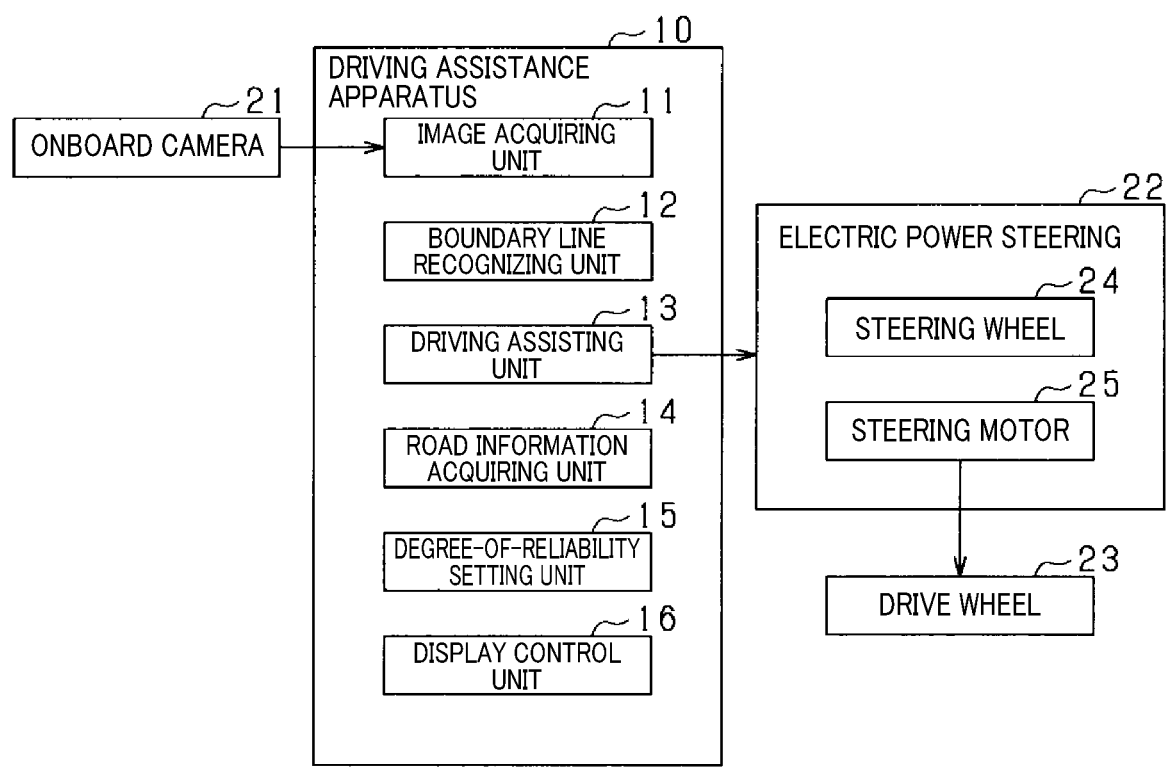
FIG. 1 is a block diagram of a control system.

An embodiment of the present disclosure will hereinafter be described with reference to the drawings. Sections that are identical or equivalent to each other among the embodiments below are given the same reference numbers in the drawings.

A control system to which a driving assistance apparatus according to the present embodiment is applied will be described with reference to the drawings. A driving assistance apparatus 10 is provided in a vehicle and performs driving assistance.

As shown in FIG. 1, the driving assistance apparatus 10 is communicably connected to a monocular camera 21. The monocular camera 21 serves as an onboard camera. The monocular camera 21 is a camera in which an image sensor, such as a charge-coupled device (CCD) or complementary metal-oxide semiconductor (CMOS) image sensor, is used. For example, the monocular camera 21 is disposed near an upper end of a front windshield of the vehicle. The monocular camera 21 captures an image of (images) a surrounding environment including a road ahead of the own vehicle. The captured image captured by the monocular camera 21 is outputted to the driving assistance apparatus 10. Here, the monocular camera 21 is provided. However, a plurality of cameras (compound-eye camera) may be provided.

The driving assistance apparatus 10 is a computer [electronic control unit (ECU)] that includes a central processing unit (CPU), a read-only memory (ROM), a random-access memory (RAM), an input/output interface, and the like. The driving assistance apparatus 10 provides various functions. For example, the driving assistance apparatus 10 provides the functions of an image acquiring unit 11, a boundary line recognizing unit 12, and a driving assisting unit 13. The various functions are actualized by running of a program that is stored in a storage memory provided in the driving assistance apparatus 10. The various functions may also be actualized by an electronic circuit that is hardware. Alternatively, at least some of the functions may be implemented by software, that is, through processes performed on the computer.

The image acquiring unit 11 acquires a captured image that has been captured by the monocular camera 21. The image acquiring unit 11 acquires the captured images at a predetermined cycle (such as 100 milliseconds). According to the present embodiment, when the captured image is acquired, the image acquiring unit 11 converts the captured image acquired from the monocular camera 12 to a plane (a view of the vehicle from directly above) based on a position (height from a road surface and an angle of depression) of the monocular camera 21. In the description hereafter, use of the captured image that has been converted to the plane is presumed. The captured image acquired from the monocular camera 21 may also be used as it is. Furthermore, the cycle may be arbitrarily changed.

The boundary line recognizing unit 12 detects a boundary line (such as a white line) from the captured image acquired by the image acquiring unit 11. The boundary line demarcates a traffic lane (referred to, hereafter, as an own lane) in which the own vehicle is driving. Specifically, the boundary line recognizing unit 12 extracts, as an edge candidate point, a point of change in contrast (edge strength) between the boundary line that demarcates the traffic lane and the road surface, based on luminance in the captured image. Then, the boundary line recognizing unit 12 extracts a candidate line for the boundary line from a series of extracted edge candidate points.

More specifically, the boundary line recognizing unit 12 continuously processes the captured images at a predetermined sampling cycle. The boundary line recognizing unit 12 extracts, as the edge candidate points, a plurality of points at which the luminance abruptly changes in a horizontal direction of the image. The boundary line recognizing unit 12 then performs the Hough transform on the plurality of extracted edge candidate points and acquires a series of edge candidate points. The boundary line recognizing unit 12 extracts a plurality of candidate lines of which the acquired series of edge candidate points serve as left and right outlines.

Then, for each of the plurality of candidate lines, the boundary line recognizing unit 12 calculates a degree of inclusion of characteristics of a boundary line (white line) that demarcates a traffic lane, for each edge candidate point. The boundary line recognizing unit 12 detects the candidate line with the greatest degree of inclusion of the characteristics as the boundary line that demarcates a traffic lane. Among the detected boundary lines, the boundary line recognizing unit 12 recognizes left and right boundary lines that are arranged near the own vehicle and such that the own vehicle is located between the left and right boundary lines, as the boundary lines (white lines) that demarcate the traffic lane in which the own vehicle is driving. The method for recognizing a boundary line is not limited thereto and may be arbitrarily modified.

The driving assisting unit 13 is configured to control a steering angle of the own vehicle and enable the own vehicle to drive along (parallel to) the boundary lines recognized by the boundary line recognizing unit 12, as driving assistance. More specifically, the driving assisting unit 13 controls an advancing direction of the own vehicle such that a lateral position of the own vehicle in a vehicle-width direction is maintained at a predetermined position within the own lane (referred to, hereafter, as a presumed own lane) that is presumed from the boundary lines (white lines) recognized by the boundary line recognizing unit 12. That is, the driving assisting unit 13 performs so-called lane keeping assist (LKA) as the driving assistance.

Figure 2:
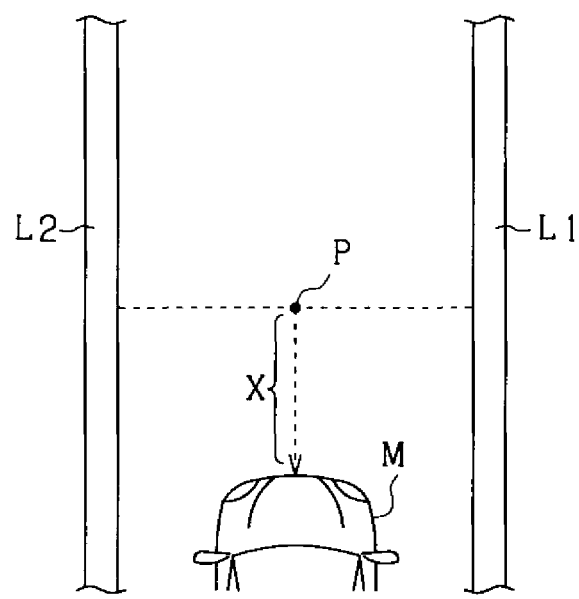
FIG. 2 is a diagram of a position of a vehicle that is maintained by lane keeping assist.

As shown in FIG. 2, according to the present embodiment, the predetermined position P is set at a lateral position that indicates a center within the presumed own lane. More specifically, the predetermined position P is set at a lateral position that indicates the center between boundary lines L1 and L2 on the left and right sides ahead of an own vehicle M by a predetermined distance X (such as 5 meters).

The predetermined position P is not limited to the lateral position that indicates the center within the presumed own lane. The predetermined position P may be set at a lateral position other than that indicating the center within the presumed own lane. In addition, as long as the predetermined position P is ahead of the own vehicle M, the predetermined distance X may be arbitrarily changed. Furthermore, the advancing direction of the own vehicle M is controlled such that a center position of the own vehicle M coincides with the predetermined position P in the vehicle-width direction.

In addition, in the own vehicle, an electric power steering 22 is provided as an apparatus that is driven based on a steering command from the driving assisting unit 13. The electric power steering 22 includes a steering 24 and a steering motor (corresponding to a motor) 25. The steering 24 operates a steering angle of a drive wheel 23 that is provided in the vehicle. The steering motor 25 generates a steering force (torque) that supplements an operating force of the steering wheel 24. The steering angle of the drive wheel 23 increases as the torque increases. In addition, during LKA control, the steering motor 25 generates a steering force (torque) to operate the steering 24 based on the steering command from the driving assisting unit 13.

According to the present embodiment, the configuration enables driving assistance to be canceled (stopped). For example, during a period in which the LKA control is being performed, when the driver operates the steering 24 such that a torque (referred to, hereafter, as a changing torque) that changes the advancing direction of the own vehicle is generated in the steering motor 25, the driving assisting unit 13 stops (cancels) the LKA control.

Here, the boundary line to be recognized by the boundary line recognizing unit 12 may not be appropriately recognized depending on road conditions. For example, in cases in which traffic lanes merge or intersect, or a traffic lane splits, as a result of the effects of the boundary lines of the other traffic lanes that merge and the like, as well as interruptions in the boundary lines of the own lane, erroneous recognition and deviation may occur, such as a distortion occurring in the boundary line of the own lane.

In addition, in cases in which an unerased line that is a trace of a boundary line that was supposed to be removed from the road is present, as a result of the effects of the unerased line, erroneous recognition and deviation may occur, such as a distortion occurring in the boundary line of the own lane. For example, the unerased line refers to a trace of a boundary line that was supposed to be removed from the road, such as when a boundary line on a road is redrawn in accompaniment with road-widening work. Furthermore, when the road gradient is of a predetermined magnitude or greater, as a result of the effects of the road gradient, perspective is erroneously recognized, and deviation may occur.

When the LKA control is performed based on such an erroneously recognized or deviated boundary line, the vehicle may drift or abruptly change course. In this case, the driver experiences discomfort. Therefore, according to the present embodiment, a degree of reliability is set for the boundary line that is recognized by the boundary line recognizing unit 12 based on road information related to the road on which the own vehicle is driving. Control content of driving assistance is varied based on the degree of reliability. Specifically, the driving assistance apparatus 10 provides a function as a road information acquiring unit 14 and a function as a degree-of-reliability setting unit 15. The road information acquiring unit 14 and the degree-of-reliability setting unit 15 will be described in detail below.

The road information acquiring unit 14 acquires the road information related to the road on which the own vehicle is driving. The road information includes road gradient information that indicates that the gradient of the road on which the own vehicle is driving is a predetermined magnitude or greater. In addition, the road information includes lane-increase information that indicates an increase in the number of traffic lanes regarding the traffic lane in which the own vehicle is driving (that is, the traffic lane splitting into a plurality of traffic lanes).

Furthermore, the road information includes intersection information that indicates that the traffic lane in which the own vehicle is driving intersects with another traffic lane. Still further, the road information includes merging information that indicates that the traffic lane in which the own vehicle is driving merges with another traffic lane. In addition, the road information also includes unerased line information indicating that an unerased line is present.

In addition, the road information acquiring unit 14 acquires the road information at a position (a position in the advancing direction) on the boundary line that is referenced during driving assistance. That is, according to the present embodiment, the road information acquiring unit 14 acquires the road information at a predetermined distance (such as 5 meters) ahead (ahead in the advancing direction) of the vehicle.

According to the present embodiment, the driving assistance apparatus 10 performs a gradient determination to determine whether or not the gradient of the road on which the own vehicle is driving is the predetermined magnitude or greater. For example, the driving assistance apparatus 10 makes the gradient determination based on curvatures of the recognized boundary lines on the left and right sides and the state in which the curvatures change, a pitch angle detected by a tilt sensor, a width of the presumed own lane and the state in which the width changes, and an amount of shifting of a lower end position of a preceding vehicle and the state in which the amount of shifting changes. The driving assistance apparatus 10 determines whether or not the gradient of the road is the predetermined magnitude or greater at the predetermined distance (such as 5 meters) ahead (ahead in the advancing direction) of the vehicle.

Regardless of whether the road is uphill or downhill, the driving assistance apparatus 10 makes an affirmative determination when the gradient of the road is the predetermined magnitude or greater. When the determination result for the gradient determination is affirmative, the road information acquiring unit 14 acquires the road gradient information that indicates that the gradient of the road on which the own vehicle is driving is the predetermined magnitude or greater.

Figure 3:
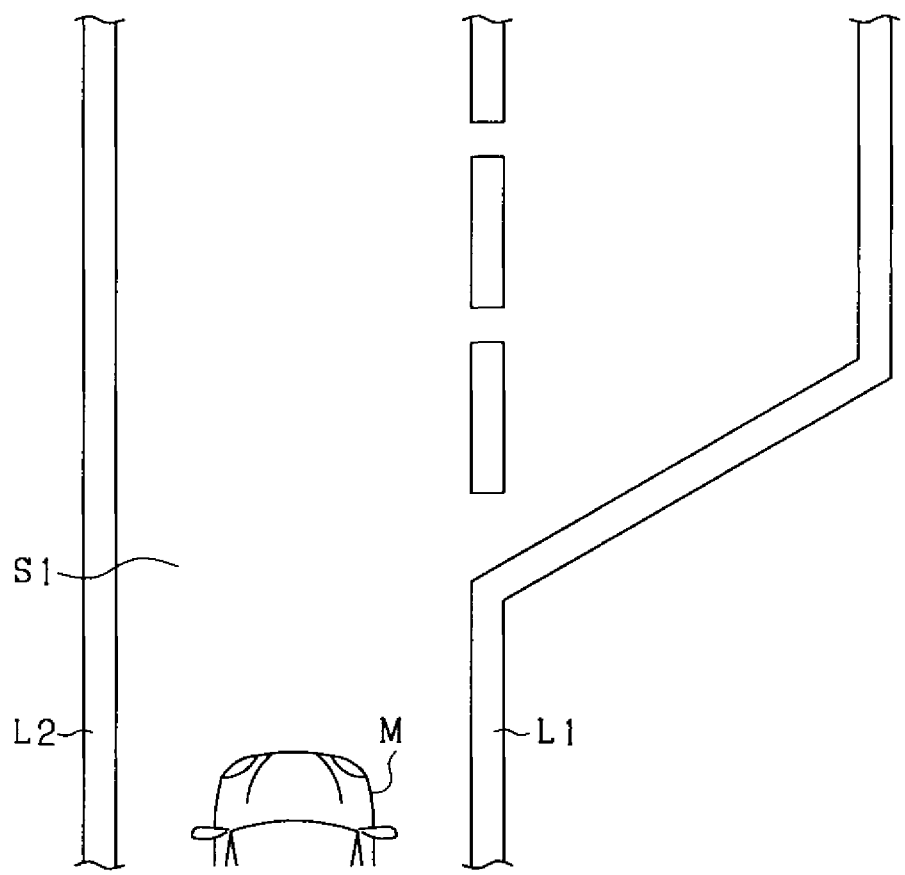
FIG. 3 is a schematic diagram of a state in which the number of traffic lanes increase.

According to the present embodiment, the driving assistance apparatus 10 performs a lane-increase determination to determine whether or not the traffic lane in which the own vehicle is driving increases to (splits into) a plurality of traffic lanes. For example, a state in which the traffic lane in which the own vehicle is driving increases indicates a state such as that shown in FIG. 3. FIG. 3 shows the state in which a traffic lane S1 in which the own vehicle M is driving increases midway.

For example, the driving assistance apparatus 10 makes the lane-increase determination based on the state in which the recognized boundary lines on the left and right sides curve, directions of the curves, changes in curvatures, and the width of the presumed own lane and the state in which the width changes. In addition, the driving assistance apparatus 10 determines whether or not the traffic lane increases at a position (a position in the advancing direction) on the boundary line that is referenced during driving assistance. That is, according to the present embodiment, the driving assistance apparatus 10 determines whether or not the traffic lane increases at a predetermined distance (such as 5 meters) ahead (ahead in the advancing direction) of the vehicle. When the determination result for the lane-increase determination is affirmative, the road information acquiring unit 14 acquires the lane-increase information that indicates that the traffic lane in which the own vehicle is driving increases.

Figure 4:
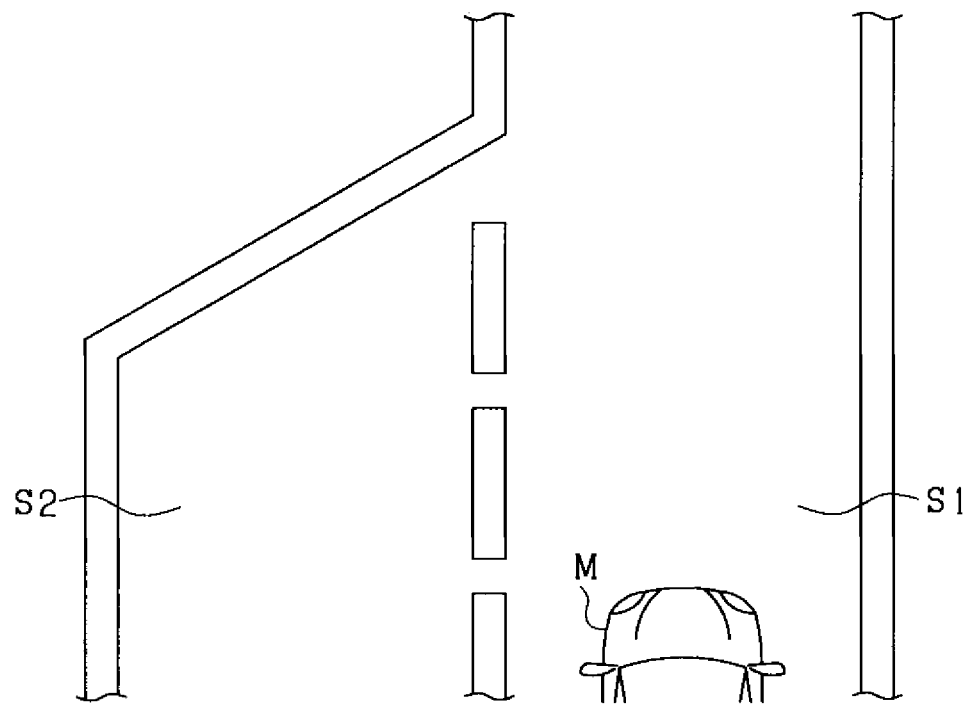
FIG. 4 is a schematic diagram of a state in which traffic lanes merge.

According to the present embodiment, the driving assistance apparatus 10 performs a merge determination to determine whether or not the traffic lane in which the own vehicle is driving merges with another traffic lane. For example, a state in which the traffic lane in which the own vehicle is driving merges with another traffic lane indicates a state such as that shown in FIG. 4. FIG. 4 shows the state in which the traffic lane S1 in which the own vehicle M is driving merges with another traffic lane S2.

For example, the driving assistance apparatus 10 makes the merge determination based on the state in which the recognized boundary lines on the left and right sides curve, the directions of the curves, the changes in curvatures, and the width of the presumed own lane and the state in which the width changes. In addition, the driving assistance apparatus 10 determines whether or not the traffic lanes merge at a position (a position in the advancing direction) on the boundary line that is referenced during driving assistance.

That is, according to the present embodiment, the driving assistance apparatus 10 determines whether or not the traffic lanes merge at a predetermined distance (such as 5 meters) ahead (ahead in the advancing direction) of the vehicle. When the determination result for the merge determination is affirmative, the road information acquiring unit 14 acquires the merging information that indicates that the traffic lane in which the own vehicle is driving merges with another traffic lane.

Figure 5:
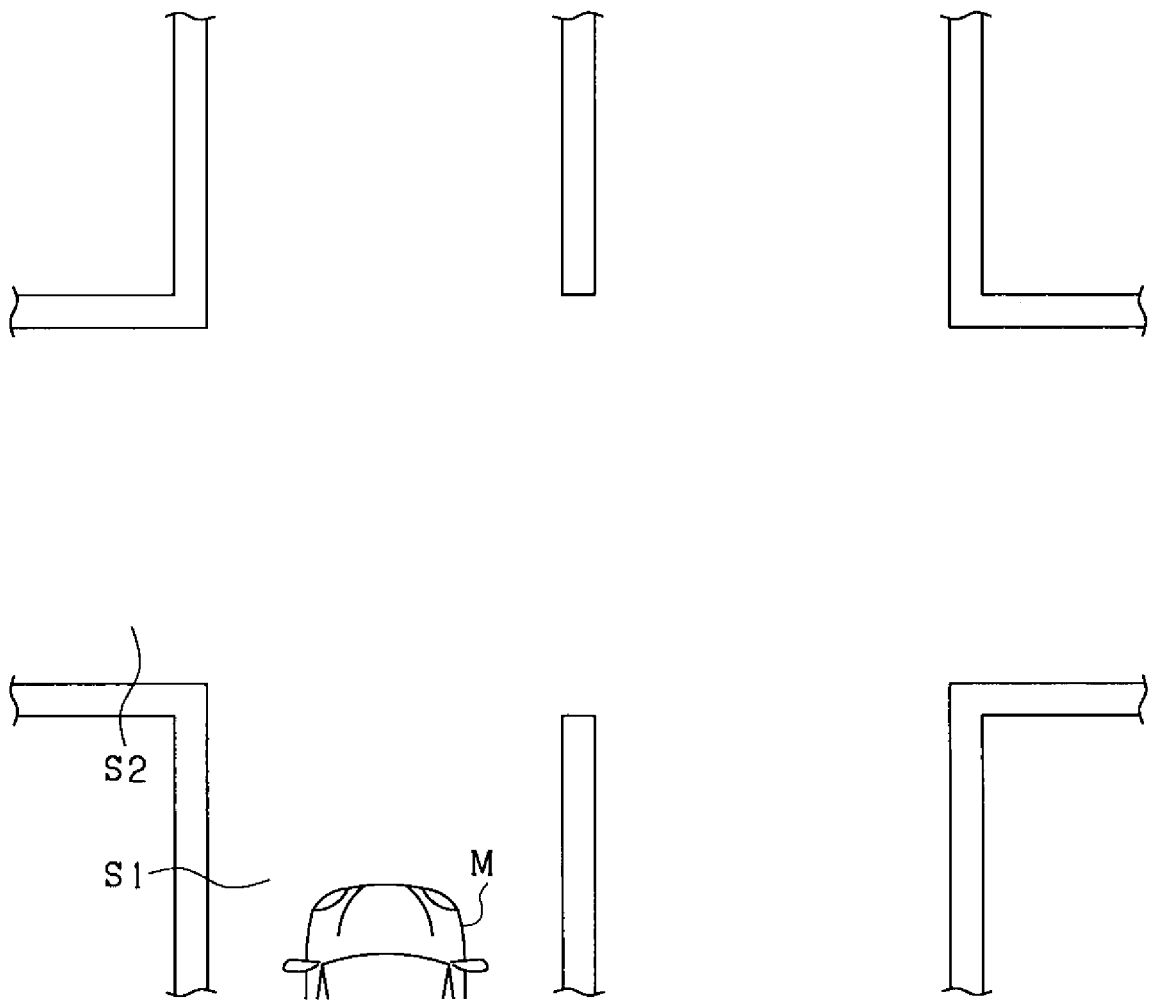
FIG. 5 is a schematic diagram of a state in which traffic lanes intersect.

According to the present embodiment, the driving assistance apparatus 10 performs an intersection determination to determine whether or not the traffic lane in which the own vehicle is driving intersects with another traffic lane. For example, a state in which the traffic lane in which the own vehicle is driving intersects with another traffic lane indicates a state such as that shown in FIG. 5. FIG. 5 shows the state in which the traffic lane S1 in which the own vehicle M is driving intersects with another traffic lane S2.

For example, the driving assistance apparatus 10 makes the intersection determination based an angle at which the other traffic lane and the own lane intersect, and the width of the presumed own lane. In addition, the driving assistance apparatus 10 determines whether or not the traffic lanes intersect at a position (a position in the advancing direction) on the boundary line that is referenced during driving assistance.

Figure 6:
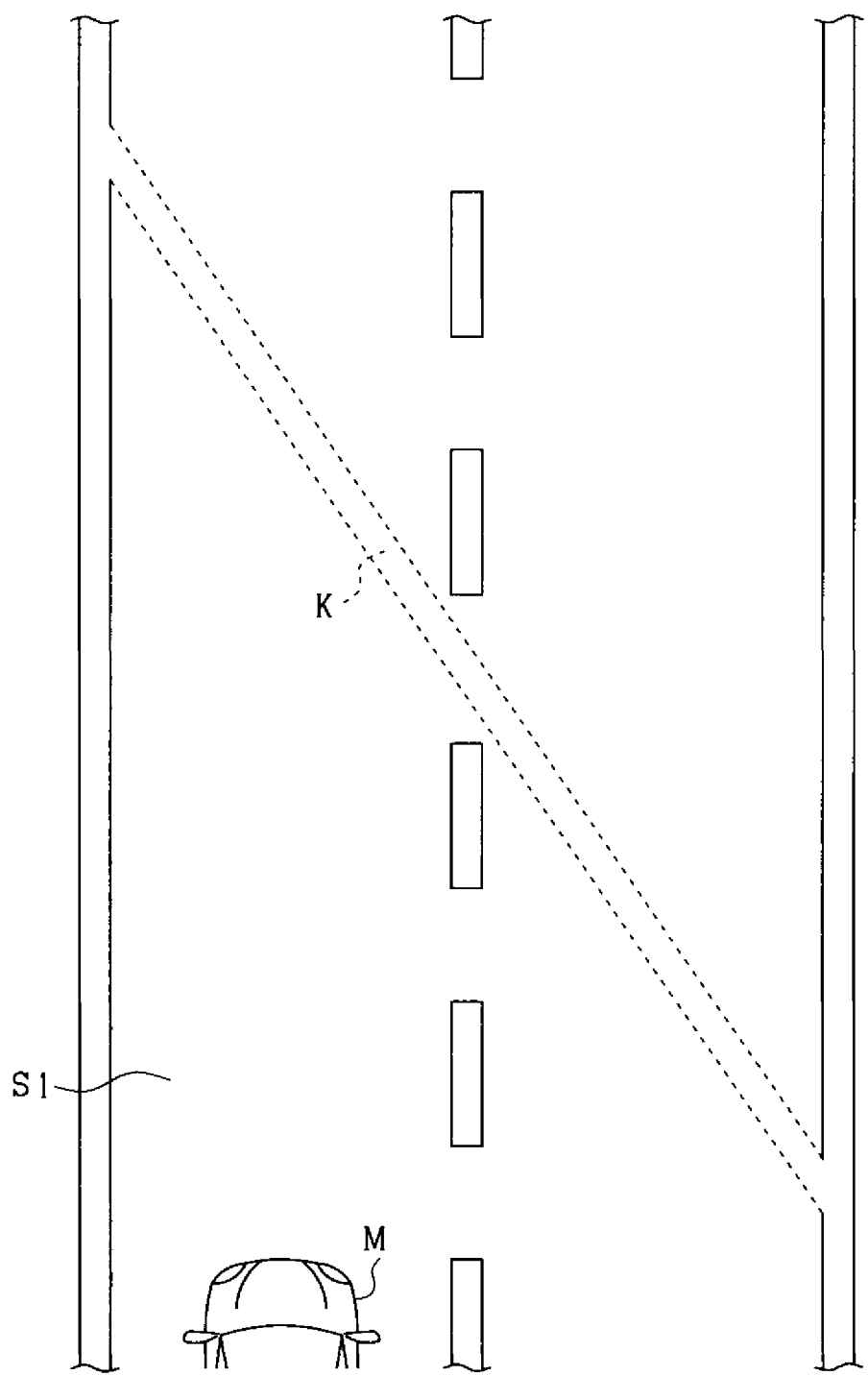
FIG. 6 is a schematic diagram of an unerased line.

That is, according to the present embodiment, the driving assistance apparatus 10 determines whether or not the traffic lanes intersect at a predetermined distance (such as 5 meters) ahead (ahead in the advancing direction) of the vehicle. When the determination result for the intersection determination is affirmative, the road information acquiring unit 14 acquires the intersection information that indicates that the traffic lane in which the own vehicle is driving intersects with another traffic lane According to the present embodiment, the driving assistance apparatus 10 performs an unerased line determination to determine whether or not an unerased line is present. For example, a state in which an unerased line is present indicates a state such as that shown in FIG. 6. FIG. 6 shows the state in which a slanted unerased line K is present in the traffic lane S1 in which the own vehicle M is driving. In FIG. 6, the unerased line K is indicated by dashed lines.

For example, the driving assistance apparatus 10 makes the unerased line determination based on angles of the recognized boundary lines on the left and right sides, and the width of the presumed own lane and the state in which the width changes. In addition, the driving assistance apparatus 10 determines whether or not an unerased line is present at a position (a position in the advancing direction) on the boundary line that is referenced during driving assistance.

That is, according to the present embodiment, the driving assistance apparatus 10 determines whether or not an unerased line is present at a predetermined distance (such as 5 meters) ahead (ahead in the advancing direction) of the vehicle. When the determination result for the unerased line determination is affirmative, the road information acquiring unit 14 acquires the unerased line information that indicates that an unerased line is present.

According to the present embodiment, the various types of road information are acquired through analysis of the boundary lines (including the candidate lines) that have been recognized from the captured images. However, the method by which the road information is acquired may be arbitrarily modified.

For example, road signs and road markers may be identified from the captured image. The road information may then be acquired from the information indicated by the road signs and the like. For example, when a road sign that indicates a decrease in traffic lanes is present in the captured image, the merge determination may be affirmative. In addition, the road information may be acquired based on map information that is used in a navigation system. Furthermore, the road information may be acquired through communication with an outside apparatus.

Next, the degree-of-reliability setting unit 15 will be described. The degree-of-reliability setting unit 15 sets the degree of reliability of the boundary line recognized by the boundary line recognizing unit 12, based on the road information acquired by the road information acquiring unit 14.

According to the present embodiment, the degree of reliability is evaluated based on six levels. The levels are prescribed as reliability level 5, reliability level 4, reliability level 3, reliability level 2, reliability level 1, and reliability level 0, in order from the highest degree of reliability (reliability level 5) to the lowest. Hereafter, the degree of reliability may also be referred to as the reliability level. An initial value (reference value) of the reliability level is set to the highest degree of reliability (reliability level 5). When any of the road information is acquired, the degree-of-reliability setting unit 15 sets the reliability level to be lower than that when none of the road information is acquired.

In addition, based on the plurality of types of road information, the degree-of-reliability setting unit 15 performs weighting corresponding to the type of road information and sets the reliability level. For example, the degree-of-reliability setting unit 15 sets the reliability level to the lowest reliability level (increases a reduction range of the reliability level) when the unerased line information is acquired, compared to that when any other type of road information is acquired. Meanwhile, the degree-of-reliability setting unit 15 reduces the reduction range of the reliability level from the initial value when the road gradient information is acquired, compared to that when any other type of road information is acquired.

More specifically, as shown in FIG. 7, when the unerased line information is acquired, the degree-of-reliability setting unit 15 sets the degree of reliability to reliability level 1, regardless of other types of road information being acquired. When the unerased line information is not acquired, and any one type of road information among the lane-increase information, the merging information, and the intersection information, and the road gradient information are acquired, the degree-of-reliability setting unit 15 sets the degree of reliability to reliability level 2. In principle, the lane-increase information and the merging information are not acquired at the same time. The lane-increase information and the intersection information are not acquired at the same time. The intersection information and the merging information are not acquired at the same time When the unerased line information and the road gradient information are not acquired, and any one type of road information among the increase information, the merging information, and the intersection information is acquired, the degree-of-reliability setting unit 15 sets the degree of reliability to reliability level 3. When only the road gradient information is acquired, the degree-of-reliability setting unit 15 sets the degree of reliability to reliability level 4. When none of the road information is acquired, the degree-of-reliability setting unit 15 sets the degree of reliability to reliability level 5. When the boundary line is not normally recognized, the degree-of-reliability setting unit 15 sets the degree of reliability to reliability level 0.

According to the present embodiment, the reliability level is set based on a point-deduction system. However, the method by which the reliability level is set may be arbitrarily modified. For example, the reliability level may be set based on a point-addition system.

When the LKA control is performed, the driving assisting unit 13 changes an upper limit of a variation range of the steering angle based on the reliability level set by the degree-of-reliability setting unit 15. For example, when the reliability level is high, the driving assisting unit 13 raises the upper limit of the variation range of the steering angle compared to that when the reliability level is low.

Specifically, in the case of reliability level 5, the driving assisting unit 13 sets the variation range of the steering angle to 0 degrees to 5 degrees. In the case of reliability level 4, the driving assisting unit 13 sets the variation range of the steering angle to 0 degrees to 4 degrees. In the case of reliability level 3, the driving assisting unit 13 sets the variation range of the steering angle to 0 degrees to 3 degrees. In the case of reliability level 2, the driving assisting unit 13 sets the variation range of the steering angle to 0 degrees to 2 degrees. In the case of reliability level 1, the driving assisting unit 13 sets the variation range of the steering angle to 0 degrees to 1 degrees. In the case of reliability level 0, the driving assisting unit 13 sets the variation range of the steering angle to 0 degrees.

Even in cases in which the reliability level is the same, the upper limit of the variation range of the steering angle may be changed taking into consideration speed. For example, in the case of reliability level 5, when the speed is high, the upper limit of the variation range may be reduced compared to that when the speed is low. Specifically, when the degree of reliability is reliability level 5 and the speed is high, the driving assisting unit 13 may set the variation range of the steering angle to 0 degrees to 5 degrees. When the degree of reliability is reliability level 5 and the speed is low, the driving assisting unit 13 may set the variation range of the steering angle to 0 degrees to 10 degrees.

In addition, the driving assistance apparatus 10 provides a function as a display control unit 16. The display control unit 16 displays the reliability level set by the degree-ofreliability setting unit 15 on a display screen of a display unit, such as a monitor, that is provided in the own vehicle.

Figure 8A:
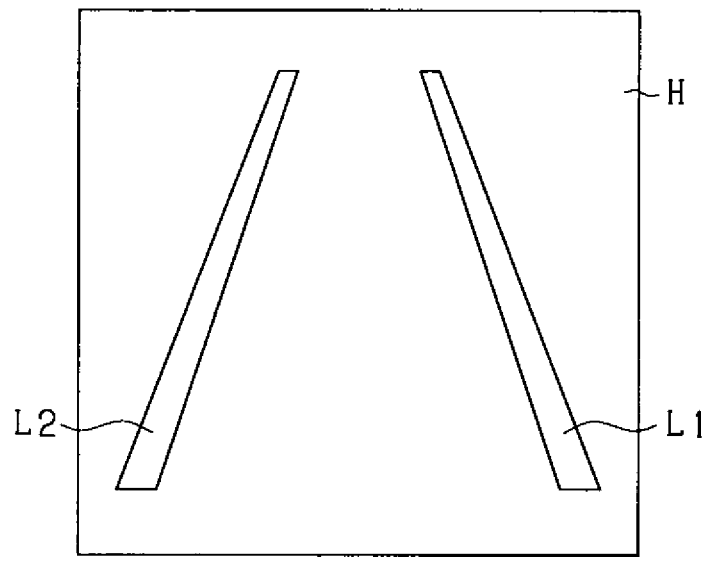
FIG. 8A and FIG. 8B are schematic diagrams of a display screen on which the degree of reliability is displayed.
Figure 8B:
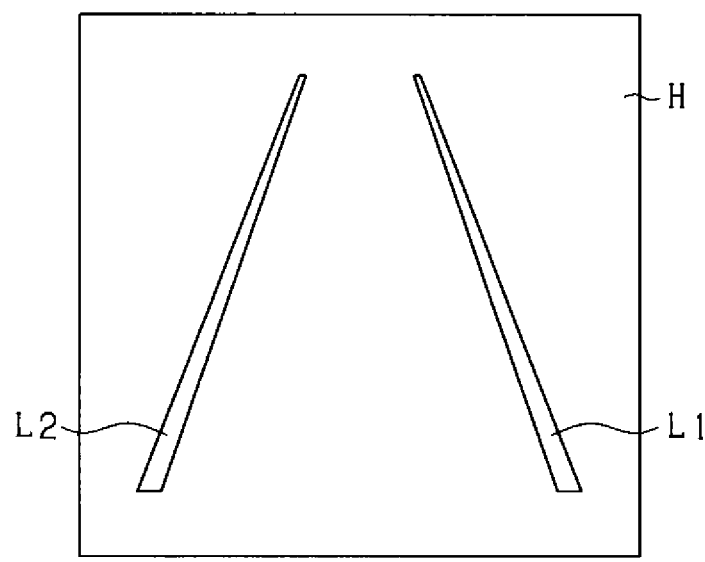

Specifically, as shown in FIG. 8, the display control unit 16 changes the thickness of left and right boundary lines L1 and L2 based on the reliability level, and displays the boundary lines L1 and L2 on a display screen H. For example, when the reliability level is high (see FIG. 8A), the display control unit 16 displays thicker boundary lines compared to that when the reliability level is low (see FIG. 8B). As long as the display content regarding the boundary line is changed based on the reliability level, the display content may be changed in any manner. For example, the display color may be changed based on the reliability level.

Next, a driving assistance process for performing driving assistance (LKA control) will be described with reference to FIG. 9. The driving assistance apparatus 10 performs the driving assistance process at a predetermined cycle (such as every 100 milliseconds) during the LKA control.

The driving assistance apparatus 10 acquires the captured image from the onboard camera (step S11). Next, the driving assistance apparatus 10 recognizes the boundary lines based on the acquired captured image (step S12). At this time, the driving assistance apparatus 10 recognizes the presumed own lane.

Next, the driving assistance apparatus 10 determines whether or not the boundary line has been normally recognized (step S13). For example, when the captured image cannot be normally acquired or when the degree of inclusion of the characteristics of a boundary line (white line) that demarcates a traffic lane is not a predetermined magnitude or greater, the driving assistance apparatus 10 determines that the boundary line is not normally recognized.

When determined that the boundary line is normally recognized (YES at Step S13), the driving assistance apparatus 10 performs the gradient determination to determine whether or not the gradient of the road on which the own vehicle is driving is the predetermined magnitude or greater (step S14). When determined that the gradient of the road on which the own vehicle is driving is the predetermined magnitude or greater (YES at step S14), the driving assistance apparatus 10 acquires the road gradient information (step S15).

When determined that the gradient of the road on which the own vehicle is driving is less than the predetermined magnitude (No at step S14) or after the process at step S15, the driving assistance apparatus 10 performs the lane-increase determination to determine whether or not the traffic lane in which the own vehicle is driving increases to (splits into) a plurality of traffic lanes (step S16). When determined that the traffic lane in which the own vehicle is driving increases to (splits into) a plurality of traffic lanes (YES at step S16), the driving assistance apparatus 10 acquires the lane-increase information (step S17).

When determined that the traffic lane in which the own vehicle is driving does not increase to (split into) a plurality of traffic lanes (NO at step S16) or after the process at step S17, the driving assistance apparatus 10 performs the merge determination to determine whether or not the traffic lane in which the own vehicle is driving merges with another traffic lane (step S18). When determined that the traffic lane in which the own vehicle is driving merges with another traffic lane (YES at step S18), the driving assistance apparatus 10 acquires the merging information (step S19).

When determined that the traffic lane in which the own vehicle is driving does not merge with another traffic lane (NO at step S18) or after the process at step S19, the driving assistance apparatus 10 performs the intersection determination to determine whether or not the traffic lane in which the own vehicle is driving intersects with another traffic lane (step S20). When determined that the traffic lane in which the own vehicle is driving intersects with another traffic lane (YES at step S20), the driving assistance apparatus 10 acquires the intersection information (step S21).

When determined that the traffic lane in which the own vehicle is driving does not intersect with another traffic lane (NO at step S20) or after the process at step S21, the driving assistance apparatus 10 performs the unerased line determination to determine whether or not an unerased line is present (step S22). When determined that an unerased line is present (YES at step S22), the driving assistance apparatus 10 acquires the unerased line information (step S23).

When determined that the boundary line is not normally recognized (NO at step S13), when determined that an unerased line is present (NO at step S22), or after the process at step S23, the driving assistance apparatus 10 performs a degree-of-reliability setting process to set the reliability level based on the acquired road information (step S24).

Figure 10:
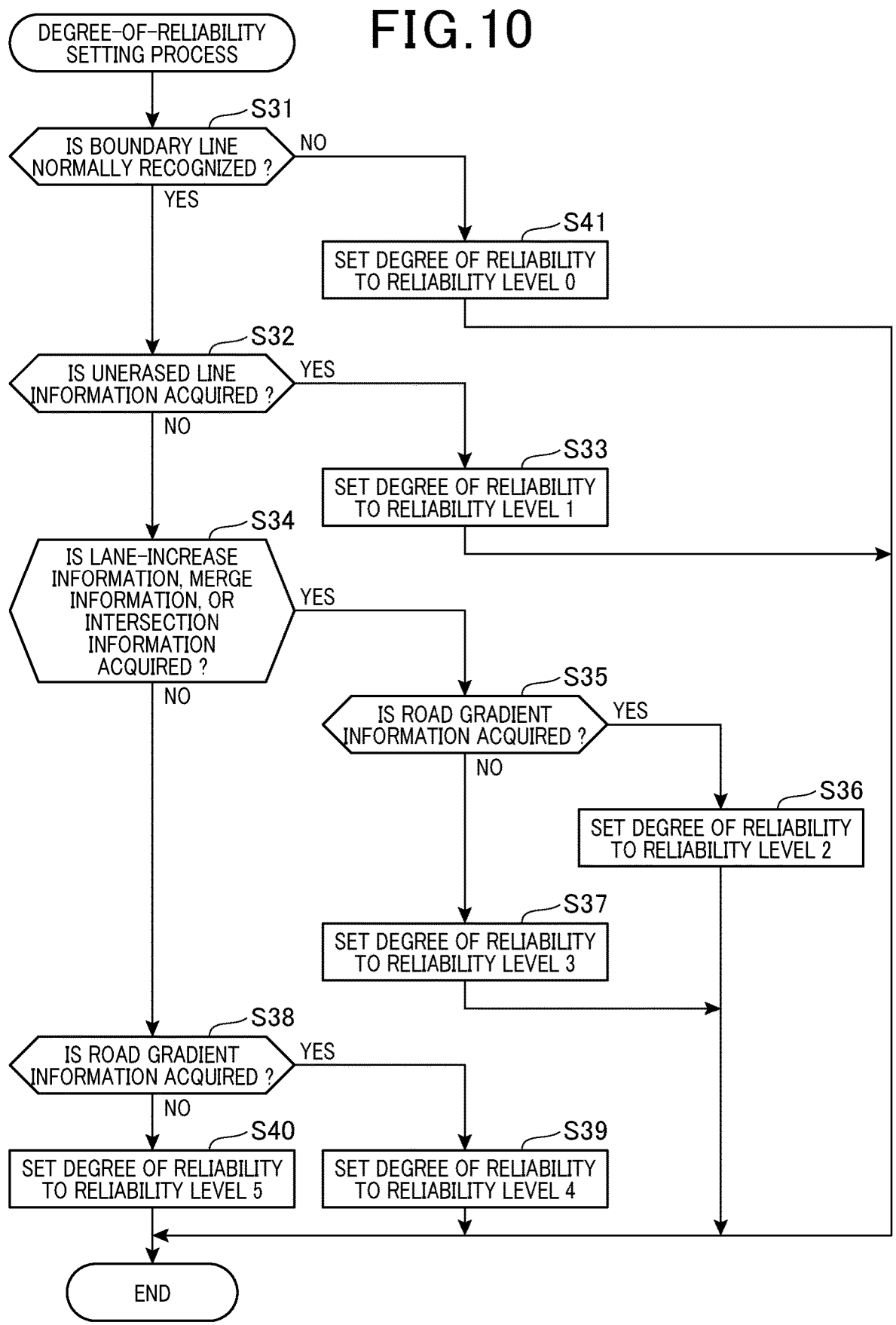
FIG. 10 is a flowchart of a degree-of-reliability setting process.

The degree-of-reliability setting process at step S24 will be described with reference to FIG. 10. The driving assistance apparatus 10 determines whether or not the boundary line is normally recognized (step S31). When determined that the boundary line is not normally recognized (NO at step S31), the driving assistance apparatus 10 sets the degree of reliability to reliability level 0 (step S41). The driving assistance apparatus 10 then ends the degree-of-reliability setting process.

When determined that the boundary line is normally recognized (YES at step S31), the driving assistance apparatus 10 determines whether or not the unerased line information is acquired (step S32). When determined that the unerased line information is acquired (YES at step S32), the driving assistance apparatus 10 sets the degree of reliability to reliability level 1 (step S33). The driving assistance apparatus 10 then ends the degree-of-reliability setting process.

When determined that the unerased line information is not acquired (NO at step S32), the driving assistance apparatus 10 determines whether or not any one type of road information among the lane-increase information, the merging information, and the intersection information is acquired (step S34).

When determined that any one type of road information among the lane-increase information, the merging information, and the intersection information is acquired (YES at step S34), the driving assistance apparatus 10 determines whether or not the road gradient information is acquired (step S35). When determined that the road gradient information is acquired (YES at step S35), the driving assistance apparatus 10 sets the degree of reliability to reliability level 2 (step S36).

The driving assistance apparatus 10 then ends the degree-of-reliability setting process. Meanwhile, when determined that the road gradient information is not acquired (NO at step S35), the driving assistance apparatus 10 sets the degree of reliability to reliability level 3 (step S37). The driving assistance apparatus 10 then ends the degree-of-reliability setting process.

When determined that any one type of road information among the lane-increase information, the merging information, and the intersection information is not acquired (NO at step S34), the driving assistance apparatus 10 determines whether or not the road gradient information is acquired (step S38). When determined that the road gradient information is acquired (YES at step S38), the driving assistance apparatus 10 sets the degree of reliability to reliability level 4 (step S39).

The driving assistance apparatus 10 then ends the degree-of-reliability setting process. Meanwhile, when determined that the road gradient information is not acquired (NO at step S38), the driving assistance apparatus 10 sets the degree of reliability to reliability level 5 (step S40). The driving assistance apparatus 10 then ends the degree-of-reliability setting process.

Here, the description will return to the driving assistance process in FIG. 9. When the degree-of-reliability setting process at step S24 is completed, the driving assistance apparatus 10 varies the control content of the driving assistance based on the reliability level (step S25). Specifically, the driving assistance apparatus 10 changes the upper limit of the variation range of the steering angle based on the reliability level.

Then, the driving assistance apparatus 10 performs the driving assistance based on the determined control content (step S26). That is, the driving assistance apparatus 10 determines the variation range of the steering angle within the set range. Then, the driving assistance apparatus 10 outputs a steering command to designate the variation range, and controls the steering angle of the vehicle. Then, the driving assistance apparatus 10 ends the driving assistance process.

According to the above-described embodiment described in detail above, the following advantageous effects are achieved.

The reliability level (degree of reliability) of the boundary line recognized by the boundary line recognizing unit 12 is set based on the road information. The control content of the driving assistance (LKA control) is varied based on the reliability level. As a result, appropriate driving assistance can be performed based on the acquired road information.

In general, the widths (the distance in the lateral direction) of the boundary lines, the traffic lane, and the like are affected by an imaging distance (perspective). However, because the widths are also affected by the road gradient, it is difficult to determine whether the widths of the boundary lines and traffic lane recognized based on the captured image change due to the effects of the imaging distance or the road gradient. Therefore, the road gradient information is included in the road information.

When the road gradient information is acquired, the reliability level is set to be lower than that when the road gradient information is not acquired. As a result, the degree of reliability of the boundary line can be appropriately set based on the road information. Appropriate driving assistance can be performed based on the road information.

When the traffic lanes increase, intersect, or merge, driving assistance may be performed based on the boundary lines of a traffic lane differing from the traffic lane in which the driver wishes to drive. In addition, the recognized boundary line may be recognized in a manner significantly deviating from the actual boundary line.

Therefore, the lane-increase information, the intersection information, and the merging information are included in the road information. When these types of road information are acquired, the reliability level is set to be lower than that when these types of road information are not acquired. As a result, the reliability level can be appropriately set based on the road information. Appropriate driving assistance can be performed based on the road information.

When an unerased line is present on the road, the unerased line and the actual boundary line may be erroneously recognized. Therefore, the unerased line information is included in the road information. When the unerased line information is acquired, the reliability level is set to be lower than that when the unerased line information is not acquired. As a result, the reliability level can be appropriately set based on the road information. Appropriate driving assistance can be performed based on the road information.

The effects on boundary line recognition differ depending on the type of road information. That is, the tendency for deviation to be significant and the like differ. Therefore, when the reliability level is set based on the plurality of types of road information, weighting is performed taking into consideration the effects on boundary line recognition. As a result, the reliability level can be appropriately set. That is, differing weighting is performed based on the type of road information, and the reliability level is thereby set. Therefore, a more appropriate driving assistance can be performed.

When an unerased line is erroneously recognized as a boundary line, the effects on driving assistance are the most significant compared to other types of road information such as the road gradient information. Therefore, when the unerased line information is acquired, the reliability level is set to the lowest level, compared to when other types of road information are acquired. As a result, appropriate driving assistance can be performed.

Even when a boundary line is erroneously recognized based on the road gradient, the effects are less (the deviation from the actual boundary line is small) compared to when the boundary line is erroneously recognized based on other types of road information. Therefore, when the road gradient information is acquired, the reduction range of the reliability level from the predetermined reference value (initial value according to the present embodiment) is reduced compared to that when other types of road information are acquired. As a result, appropriate driving assistance can be performed.

The upper limit of the variation range of the steering angle is changed based on the reliability level. As a result of the upper limit of the variation range of the steering angle being changed based on the reliability level, the occurrence of an abrupt change in course can be suppressed. For example, when the reliability level is low, the upper limit of the variation range is reduced. As a result, even when the error between the recognized boundary line and the actual boundary line is significant, drifting of the vehicle can be suppressed.

The reliability level is displayed on a display screen in the own vehicle. As a result, the driver can easily confirm the reliability level that is set based on the road information. In addition, the driver can use the reliability level as a criterion for determining whether or not to cancel driving assistance.

Other Embodiments

The present disclosure is not limited to the above-described embodiment. For example, the present disclosure may be carried out as described below. Hereafter, sections that are identical or equivalent to each other among the embodiments are given the same reference numbers. Descriptions of sections having the same reference numbers are applicable therebetween.

According to the above-described embodiment, when performing the driving assistance (LKA control), the driving assisting unit 13 controls the behavior of the vehicle by changing the steering angle. However, the driving assisting unit 13 may control an amount of lateral movement of the vehicle. In this case, the driving assisting unit 13 may change an upper limit of a lateral movement distance based on the degree of reliability.

According to the above-described embodiment, in the driving assistance, the driving assisting unit 13 may also be capable of controlling a vehicle speed. The driving assisting unit 13 may also change an upper limit of a variation range of the vehicle speed based on the degree of reliability.

According to the above-described embodiment, in the driving assistance, when the reliability level is low, the driving assisting unit 13 may reduce the variation range of the steering angle compared to that when the reliability level is high.

According to the above-described embodiment, the degree-of-reliability setting unit 15 acquires the road information at the position (the position in the advancing direction) on the boundary line that is referenced during driving assistance. The degree-of-reliability setting unit 15 then sets the reliability level based on the road information.

As another example, the degree-of-reliability setting unit 15 may successively set the degree of reliability of the boundary line recognized within the captured image along the advancing direction of the own vehicle. The display control unit may display in advance the degree of reliability of the boundary line that is referenced after the boundary line that is currently referenced for driving assistance.

For example, the road information acquiring unit 14 performs the various determinations (such as the gradient determination) based on the recognized boundary lines and the like, at a predetermined interval (such as every 5 meters) in the advancing direction. The road information acquiring unit 14 acquires the road information at the predetermined interval.

Figure 11:
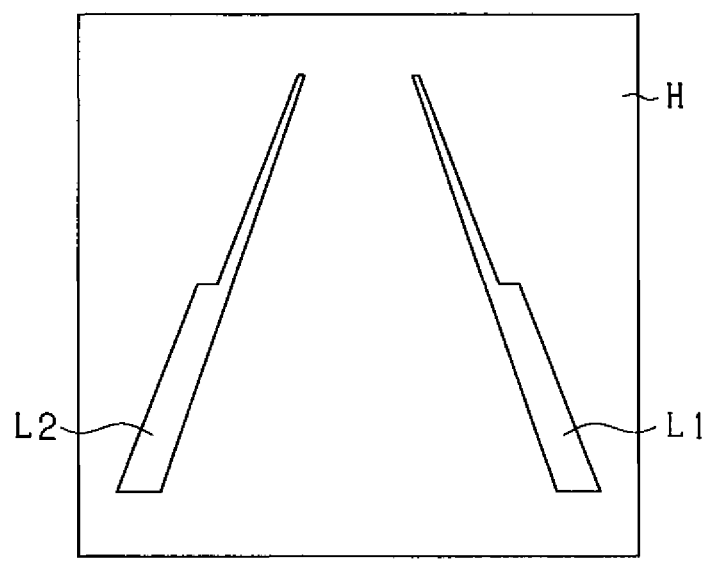
FIG. 11 is a schematic diagram of a display screen on which the degree of reliability is displayed in another example.

Then, the degree-of-reliability setting unit 15 sets the reliability level at the predetermined interval in the advancing direction, based on the road information acquired at the predetermined interval. Next, the display control unit 16 displays the reliability level at the predetermined interval. That is, as shown in FIG. 11, the boundary lines L1 and L2 of a thickness based on the reliability level may be displayed at a predetermined interval.

As a result, the driver can more appropriately determine whether or not to allow driving assistance to be performed. That is, when the reliability level of the boundary line referenced after the current boundary line is low, such as when the reliability level of the boundary line that is ahead in the advancing direction is continuously low, the driver can cancel the driving assistance in advance based on the reliability level that is displayed in advance. As a result, the driving assistance being performed based on a boundary line of which the reliability level is low and effects such as abrupt drifting of the vehicle emerging can be suppressed.

According to the above-described embodiment, when the degree of reliability (reliability level) is lower than a threshold, the driving assistance apparatus 10 may perform control [adaptive cruise control (ACC)] in which the own vehicle is made to track another vehicle that is driving ahead of the own vehicle.

More specifically, the driving assistance apparatus 10 is provided with a function as a vehicle information acquiring unit that acquires information related to another vehicle that is driving ahead of the own vehicle in the traffic lane in which the own vehicle is driving, such as by a millimeter-wave radar.

When the reliability level is the threshold or higher, the driving assistance apparatus 10 performs the LKA control and enables the own vehicle to drive along the boundary lines. Meanwhile, when the reliability level is lower than the threshold, the driving assistance apparatus 10 makes the own vehicle track the other vehicle based on the information related to the other vehicle acquired by the vehicle information acquiring unit.

As a result, when the reliability level of the boundary line is low based on comprehensive determination of the plurality of types of road information, the own vehicle can be made to track the other vehicle. A degree of contribution of the boundary lines and a degree of contribution of the information related to another vehicle to driving assistance may be changed based on the degree of reliability.

That is, when the degree of reliability is the threshold or higher, the driving assistance apparatus 10 performs driving assistance so as to give more weight to the boundary lines than the information related to another vehicle. When the degree of reliability is lower than the threshold, the driving assistance apparatus 10 performs driving assistance so as to give more weight to the information related to another vehicle than the boundary lines.

According to the above-described embodiment, lane deviation prevention control that prevents deviation from a traffic lane may be performed as the driving assistance.

According to the above-described embodiment, when the driving assistance (LKA control) is canceled, when the reliability level is low, the driving assistance may be canceled even when the changing torque is smaller compared to that when the reliability level is high.

According to the above-described embodiment, the types of road information may be arbitrarily increased or decreased. For example, the intersection information may not be used. In addition, information that indicates that a tunnel is present may be used as the road information. Furthermore, information that indicates that the road is under construction may be used as the road information. The degree of reliability of the boundary line may be reduced when these types of road information are acquired.

According to the above-described embodiment, when the gradient of the road is the predetermined magnitude or greater, the degree of reliability is reduced. However, the reduction range of the degree of reliability may be changed based on the gradient.

According to the above-described embodiment, the reduction range of the degree of reliability from the predetermined reference value (such as the initial value) is the same when one of the lane-increase information, the intersection information, and the merging information is acquired. However, the reduction range may differ. For example, the reduction range of the degree of reliability when the intersection information is acquired may be greater than that when the lane-increase information (or the merging information) is acquired.

According to the above-described embodiment, the reduction range of the degree of reliability from the predetermined reference value (such as the initial value) differs based on the type of road information. However, the reduction range may be arbitrarily changed. For example, the degree of reliability may be similarly reduced regardless of the type of road information acquired.

What is claimed is:

1. A driving assistance apparatus comprising:
    an image acquiring unit that acquires a captured image captured by an onboard camera;
    a boundary line recognizing unit that recognizes a boundary line that demarcates a traffic lane in which an own vehicle is driving, based on the captured image acquired by the image acquiring unit;

a road information acquiring unit that acquires road information related to a road on which the own vehicle is driving;

a degree-of-reliability setting unit that sets a degree of reliability of the boundary line recognized by the boundary line recognizing unit, based on the road information acquired by the road information acquiring unit; and a driving assisting unit that performs driving assistance of the own vehicle based on the boundary line recognized by the boundary line recognizing unit, and varies control content of the driving assistance based on the degree of reliability, wherein the road information includes road gradient information that indicates that a longitudinal gradient of the road is a predetermined magnitude or greater, and in response to the longitudinal gradient of the road being equal to or greater than the predetermined magnitude based on the road gradient information being detected by the image acquiring unit, the degree-of-reliability setting unit sets the degree of reliability of the boundary line to be lower compared to that when the longitudinal gradient of the road is less than the predetermined magnitude being detected by the image acquiring unit.

2. The driving assistance apparatus according to claim 1, wherein:

the road information includes at least one of lane-increase information that indicates that the traffic lane in which the own vehicle is driving increases to a plurality of traffic lanes, intersection information that indicates that the traffic lane in which the own vehicle is driving intersects with another traffic lane, and merging information that indicates that the traffic lane in which the own vehicle is driving merges with another traffic lane; and in response to at least one of the lane-increase information, the intersection information, and the merging information being acquired, the degree-of-reliability setting unit sets the degree of reliability to be lower compared to that when none of the lane-increase information, the intersection information, and the merging information is acquired.

3. The driving assistance apparatus according to claim 1, wherein:

the road information includes unerased line information that indicates that an unerased line is present, the unerased line being a trace of a boundary line that was supposed to be removed from the road; and in response to the unerased line information being acquired, the degree-of-reliability setting unit sets the degree of reliability to be lower compared to that when the unerased line information is not acquired.

4. The driving assistance apparatus according to claim 1, wherein:

the degree-of-reliability setting unit performs, based on a plurality of types of road information, weighting that corresponds to the type of road information and sets the degree of reliability.

5. The driving assistance apparatus according to claim 1, wherein:

the road information includes unerased line information that indicates that an unerased line is present, the unerased line being a trace of a boundary line that was supposed to be removed from the road, and also includes, as road information other than the unerased line information, at least one of:

road gradient information that indicates that a gradient of the road is a predetermined magnitude or greater, lane-increase information that indicates that the traffic lane in which the own vehicle is driving increases to a plurality of traffic lanes, intersection information that indicates that the traffic lane in which the own vehicle is driving intersects with another traffic lane, and merging information that indicates that the traffic lane in which the own vehicle is driving merges with another traffic lane; and in response to the unerased line information being acquired, the degree-of-reliability setting unit sets the degree of reliability to be the lower compared to that when the road information other than the unerased line information is acquired.

6. The driving assistance apparatus according to claim 1, wherein:

the road information includes road gradient information that indicates that a gradient of the road is a predetermined magnitude or greater and also includes, as road information other than the road gradient information, at least one of:

lane-increase information that indicates that the traffic lane in which the own vehicle is driving increases to a plurality of traffic lanes, intersection information that indicates that the traffic lane in which the own vehicle is driving intersects with another traffic lane, merging information that indicates that the traffic lane in which the own vehicle is driving merges with another traffic lane, and unerased line information that indicates that an unerased line is present; and in response to the road gradient information being acquired, the degree-of-reliability setting unit reduces a reduction range of the degree of reliability from a predetermined reference value, compared to that when the road information other than the road gradient information is acquired.

7. A driving assistance apparatus comprising:

an image acquiring unit that acquires a captured image captured by an onboard camera;

a boundary line recognizing unit that recognizes a boundary line that demarcates a traffic lane in which an own vehicle is driving, based on the captured image acquired by the image acquiring unit;

a road information acquiring unit that acquires road information related to a road on which the own vehicle is driving;

a degree-of-reliability setting unit that sets a degree of reliability of the boundary line recognized by the boundary line recognizing unit, based on the road information acquired by the road information acquiring unit; and a driving assisting unit that performs driving assistance of the own vehicle based on the boundary line recognized by the boundary line recognizing unit, and varies control content of the driving assistance based on the degree of reliability, wherein:

the degree of reliability of the boundary line includes three or more reliability levels of the boundary line, the driving assisting unit:

controls a steering angle of the own vehicle and enables the own vehicle to drive along the boundary line as the driving assistance, and changes an upper limit of a variation range of the steering angle based on the three or more reliability levels of the boundary line, the road information includes at least one of lane-increase information that indicates that the traffic lane in which the own vehicle is driving increases to a plurality of traffic lanes, intersection information that indicates that the traffic lane in which the own vehicle is driving intersects with another traffic lane, and merging information that indicates that the traffic lane in which the own vehicle is driving merges with another traffic lane, and in response to at least one of the lane-increase information, the intersection information, and the merging information being acquired, the degree-of-reliability setting unit sets the degree of reliability to be lower compared to that when none of the lane-increase information, the intersection information, and the merging information is acquired.

8. The driving assistance apparatus according to claim 1, further comprising:

a display control unit that displays the degree of reliability of the boundary line on a display screen.

9. The driving assistance apparatus according to claim 8, wherein:

the degree-of-reliability setting unit successively sets the degree of reliability of the boundary line in the captured image along an advancing direction of the own vehicle; and the display control unit displays in advance the degree of reliability of the boundary line that is referenced after the boundary line that is currently referenced in the driving assistance.

10. The driving assistance apparatus according to claim 1, further comprising:

a vehicle information acquiring unit that acquires information related to an other vehicle that is driving ahead of the own vehicle in the traffic lane in which the own vehicle is driving; wherein the driving assisting unit:

enables the own vehicle to drive along the boundary line in response to the degree of reliability being at a threshold or higher, and enables the own vehicle to track the other vehicle based on the information related to the other vehicle acquired by the vehicle information acquiring unit in response to the degree of reliability being lower than the threshold.

11. The driving assistance apparatus according to claim 1, further comprising:

a vehicle information acquiring unit that acquires information related to another vehicle that is driving ahead of the own vehicle in the traffic lane in which the own vehicle is driving, wherein the driving assisting unit:

performs driving assistance using the boundary line recognized by the boundary line recognizing unit and the information related to the other vehicle acquired by the vehicle information acquiring unit, performs driving assistance in which the boundary line is given more weight than the information related to the other vehicle in response to the degree of reliability being at a threshold or higher, and performs driving assistance in which the information related to the other vehicle is given more weight than the boundary line in response to the degree of reliability being lower than the threshold.

12. A driving assistance method comprising:

acquiring by an image acquiring unit, a captured image captured by an onboard camera;

recognizing a boundary line that demarcates a traffic lane in which an own vehicle is driving, based on the acquired captured image;

acquiring road information related to a road on which the own vehicle is driving;

setting a degree of reliability of the recognized boundary line, based on the acquired road information; and performing driving assistance of the own vehicle based on the recognized boundary line, and varying control content of the driving assistance based on the degree of reliability, wherein the road information includes road gradient information that indicates that a longitudinal gradient of the road is a predetermined magnitude or greater, and in response to the longitudinal gradient of the road being equal to or greater than the predetermined magnitude based on the road gradient information being detected by the image acquiring unit, the degree of reliability of the boundary line is set to be lower compared to that when the longitudinal gradient of the road is less than the predetermined magnitude being detected by the image acquiring unit.

* * * * *